(12) United States Patent
Mozer

(10) Patent No.: US 10,582,167 B2
(45) Date of Patent: Mar. 3, 2020

(54) TRIGGERING VIDEO SURVEILLANCE USING EMBEDDED VOICE, SPEECH, OR SOUND RECOGNITION

(71) Applicant: Sensory, Incorporated, Santa Clara, CA (US)

(72) Inventor: Todd F. Mozer, Los Altos Hills, CA (US)

(73) Assignee: SENSORY, INC., Santa Clara, CA (US)

(*) Notice: Subject to any disclaimer, the term of this patent is extended or adjusted under 35 U.S.C. 154(b) by 189 days.

(21) Appl. No.: 14/840,463

(22) Filed: Aug. 31, 2015

(65) Prior Publication Data

US 2017/0064262 A1    Mar. 2, 2017

(51) Int. Cl.
   *H04N 7/18*         (2006.01)
   *G08B 13/196*       (2006.01)
   *G06K 9/00*         (2006.01)

(52) U.S. Cl.
   CPC ....... *H04N 7/188* (2013.01); *G08B 13/19682* (2013.01); *G08B 13/19689* (2013.01)

(58) Field of Classification Search
   CPC .... H04N 7/188; H04N 5/23216; G08B 13/00; G08B 13/19682; G08B 13/19689
   See application file for complete search history.

(56) References Cited

U.S. PATENT DOCUMENTS

| | | | | |
|---|---|---|---|---|
| 4,485,400 A | * | 11/1984 | Lemelson | H04N 7/12 346/145 |
| 6,107,918 A | * | 8/2000 | Klein | G08B 25/14 340/3.1 |
| 2008/0309759 A1 | * | 12/2008 | Wilson | G08B 13/1968 348/143 |
| 2011/0119716 A1 | * | 5/2011 | Coleman, Sr. | H04N 7/181 725/62 |
| 2012/0282974 A1 | * | 11/2012 | Green | G08B 13/19689 455/550.1 |
| 2014/0049636 A1 | * | 2/2014 | O'Donnell | G08C 17/02 348/143 |
| 2014/0214429 A1 | * | 7/2014 | Pantel | G10L 21/16 704/275 |
| 2015/0073795 A1 | * | 3/2015 | Tan | G10L 15/063 704/243 |
| 2015/0172441 A1 | * | 6/2015 | Samhat | H04M 1/72563 455/418 |

* cited by examiner

*Primary Examiner* — Obafemi O Sosanya
(74) *Attorney, Agent, or Firm* — Fountainhead Law Group P.C.

(57) ABSTRACT

Techniques for automatically triggering video surveillance using embedded voice, speech, or sound recognition are provided. In one embodiment, a computer system can receive an audio signal captured from an area to be monitored via video surveillance. The computer system can further recognize, via an embedded recognition component, a voice, speech phrase, or environmental sound in the audio signal, and can determine that the recognized voice, speech phrase, or environmental sound corresponds to a predefined trigger condition. The computer system can then automatically transmit a signal to one or more video capture devices to begin video recording of the area.

24 Claims, 3 Drawing Sheets

TRIGGERING VIDEO SURVEILLANCE USING EMBEDDED VOICE, SPEECH, OR SOUND RECOGNITION

BACKGROUND

Video surveillance, which is the act of observing and/or capturing video of an area using one or more cameras, is a commonly used technique in both public and private environments for improving the security and safety of those environments. From a security perspective, video surveillance is most effective when it is "always on" (i.e., observing or capturing video of an area on a continuous and ongoing basis). This is because the cameras performing such always-on video surveillance can capture all attempted intrusions, thefts, or other security breaches within the vicinity of the monitored area, regardless of when those breaches may occur.

However, as may be appreciated, always-on video surveillance can raise privacy concerns when used in a private setting, such as a home. For example, assume that a homeowner has a security system installed in his/her house, with a camera that is configured to constantly record all activity within the homeowner's living room. In this scenario, the homeowner may feel uncomfortable about being "watched" on a continuous basis as the homeowner and his/her family interact/congregate in the living room. In addition, the homeowner may be feel uncomfortable about who may inadvertently get a hold of the recorded video footage, and what it may potentially be used for. This is particularly true if the security system is operated by a third-party service provider and the recorded footage is sent to a remote data center operated by the service provider.

One way to mitigate these privacy concerns is to allow the homeowner to disable and enable the video surveillance within his/her home at-will. Unfortunately, this approach can significantly reduce the effectiveness of the security system, since the homeowner will generally have no idea of when a security beach or emergency situation may occur. Further, this approach is cumbersome because it requires the homeowner to manually interact with the security system each time he/she wishes to turn on or turn off the camera.

SUMMARY

Techniques for automatically triggering video surveillance using embedded voice, speech, or sound recognition are provided. In one embodiment, a computer system can receive an audio signal captured from an area to be monitored via video surveillance. The computer system can further recognize, via an embedded recognition component, a voice, speech phrase, or environmental sound in the audio signal, and can determine that the recognized voice, speech phrase, or environmental sound corresponds to a predefined trigger condition. The computer system can then automatically transmit a signal to one or more video capture devices to begin video recording of the area.

A further understanding of the nature and advantages of the embodiments disclosed herein can be realized by reference to the remaining portions of the specification and the attached drawings.

DETAILED DESCRIPTION

Figure 1:
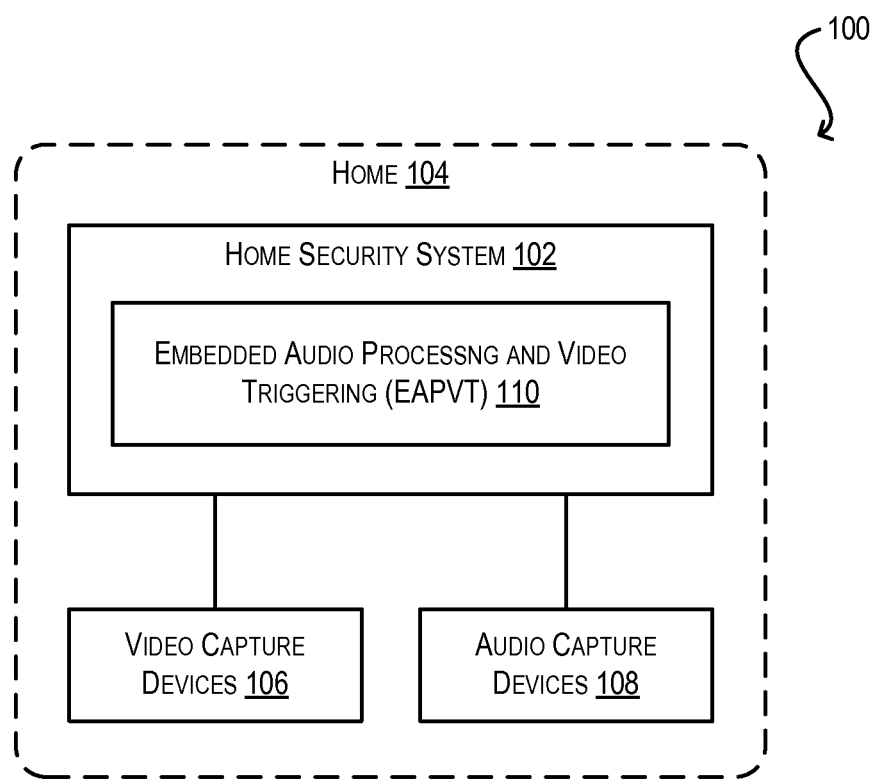
FIG. 1 depicts a system environment according to an embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

The present disclosure describes techniques that can be implemented by a computer system for automatically triggering video surveillance in response to predefined conditions that are determined via embedded voice, speech, and/or sound recognition. According to one set of embodiments, the computer system can capture (using, e.g., one or more microphones) audio on a continuous basis within a location such as a home. In addition, the computer system can analyze the captured audio signal as it is received and can attempt to recognize voices, speech phrases, and/or an environmental sounds in the audio signal in real-time or near real-time. Significantly, the computer system can perform this voice/speech/sound recognition in an "embedded" fashion—in other words, locally on the computer system, without interacting with a remote computing resource.

If the computer system recognizes a voice, speech phrase, and/or environmental sound that corresponds to a condition previously defined by a user (e.g., the homeowner), the computer system can automatically turn on one or more video cameras, thereby initiating video surveillance of the location. For example, the computer system may recognize the phrase "Fire!" or "Help!", which may each correspond to a condition defined by the homeowner for triggering video surveillance. As another example, the computer system may recognize an unknown voice (e.g., a voice that does not belong to any registered household member), which may also correspond to predefined trigger condition. In certain embodiments, in addition to turning on the one or more video cameras, the computer system can alert the homeowner or a third party that video surveillance has been started. This, in turn, can allow the homeowner or third party to observe the video footage via an appropriate interface (e.g., a local display screen, a smartphone app, etc.), and/or take one or more other actions in response to the alert (e.g., make a phone call, control an alarm, etc.).

After some period of time, or after the occurrence of a predefined termination event, the computer system can automatically turn off the one or more video cameras and save the recorded video footage to a local or remote data store. Finally, the computer system can begin listening for audio again within the location, thereby enabling the computer system to re-initiate video surveillance if another voice, speech, and/or environmental sound-based trigger condition is detected.

With the approach described above, many of the privacy concerns associated with always-on video surveillance in a home are rendered moot because such surveillance is only enabled in response to conditions that are specifically authorized by the homeowner. Accordingly, the homeowner does not need to worry that the video cameras in his/her home will record the activities of the homeowner or his/her family at unexpected times. Further, the homeowner may generally feel more comfortable knowing that he/she is not being constantly "watched" by the cameras. While the computer system does listen for audio on a continuous basis, since the audio recognition processing is embedded (i.e., performed locally) on that system, there is little to no risk that the captured audio will be improperly accessed or abused.

At the same time, the foregoing approach provides a level of security that is comparable to always-on video surveillance. This is because the voice/speech/sound-based trigger conditions ensure that video surveillance is enabled at times when it is most likely needed (e.g., during an attempted security breach or other emergency situation), and disabled at times when it is most likely not needed. Therefore, this approach provides a security solution that is less intrusive than, and yet equally effective as, always-on video surveillance.

The foregoing and other aspects of the present disclosure are described in further detail in the sections that follow.

2. System Environment

FIG. 1 depicts a system environment 100 according to an embodiment. As shown, system environment 100 comprises a home security system 102 within a home 104. Home security system 102, which may be implemented using a general purpose or specialized computer system/device, is communicatively coupled with one or more video capture devices (e.g., video cameras) 106 and one or more audio capture devices (e.g., microphones) 108. Video capture devices 106 and audio capture devices 108 may be placed at various locations within or outside home 104 (e.g., at front/side/back entrances, in garage, in living room, in kitchen, etc.).

Generally speaking, home security system 102 can interact with video capture devices 106 to perform video surveillance within home 104. For example, video capture devices 106 can record video footage of the various areas in which they are located and can send the footage to home security system 102. Home security system 102 can then save the recorded footage locally and/or transmit the recorded footage to a remote location (e.g., a server operated by a third-party security service provider) for review and storage.

As noted in the Background section, video surveillance is typically most effective when it is performed in an always-on fashion; this ensures that there are no gaps in the recorded video footage during which security breaches may occur. However, always-on video surveillance raises a number of privacy concerns, particularly when used in private settings such as home 104.

To address these and other similar issues, home security system 102 of FIG. 1 includes an embedded audio processing and video triggering (EAPVT) component 110. EAPVT component 110 is embedded in the sense that it is implemented and executed entirely within home security system 102, without any need to employ remote computing resources. As described in further detail below, EAPVT component 110 can cause home security system 102 to continuously listen for audio in an area of home 104 to be monitored. Upon recognizing a voice, speech phrase, and/or environment sound corresponding to a predefined condition (e.g., unknown voice, glass breaking, scream, etc.), EAPVT component 110 can automatically turn on the video capture device(s) in the monitored area, thereby enabling home security system 102 to begin video surveillance. EAPVT component 110 can then automatically turn off the video capture device(s) after some period of time, or upon occurrence of a predefined termination event. With these techniques, EAPVT component 110 can ensure that video surveillance is enabled within home 104 at the times when it is most likely to be needed, while minimizing the privacy impact on the home's occupants.

It should be appreciated that system environment 100 of FIG. 1 is illustrative and not intended to limit embodiments of the present disclosure. For example, the various entities shown in system environment 100 may be arranged according to different configurations, and may include subcomponents or implement functions that are not specifically described herein. One of ordinary skill in the art will recognize many variations, modifications, and alternatives.

3. Workflow

Figure 2:
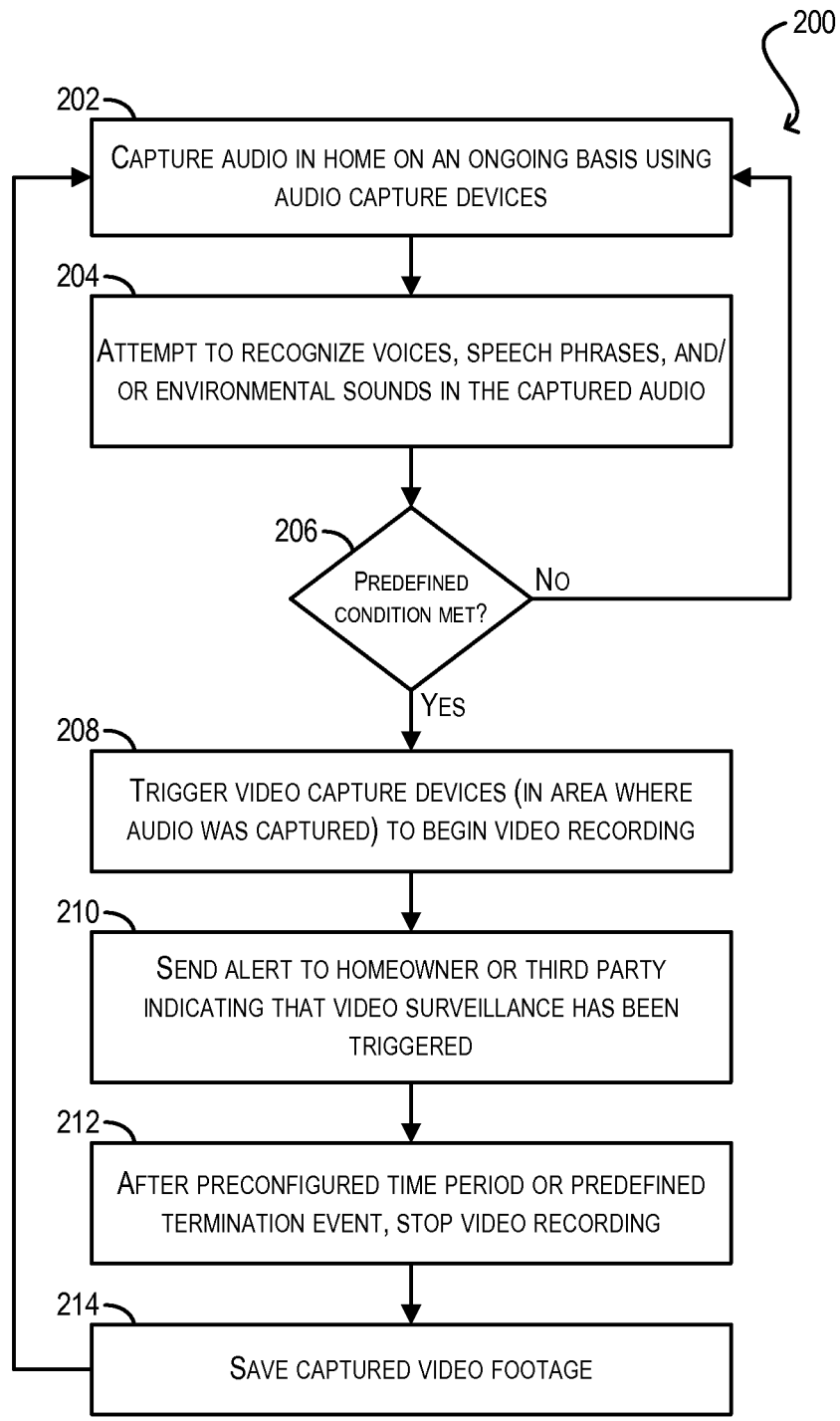
FIG. 2 depicts a flowchart for triggering video surveillance using embedded voice/speech/sound recognition according to an embodiment.

FIG. 2 depicts a workflow 200 that can be performed by home security system 102/EAPVT component 110 for automatically triggering video surveillance using embedded voice/speech/sound recognition according to an embodiment.

Starting with block 202, EAPVT component 110 can use audio capture devices 108 to listen for audio in various areas of home 104 on an ongoing basis. As part of this step, EAPVT component 110 can receive a continuous audio signal from each audio capture device 108, process the audio signal in real-time or near real-time, and based on that processing, attempt to recognize one or more voices, speech phrases, and/or environmental sounds in the audio signal (block 204). EAPVT component 110 can perform this recognition processing using any of a number of known voice, speech, and sound recognition techniques known in the art. Further, as mentioned previously, EAPVT component 110 can perform this recognition processing in an embedded manner, such that the captured audio signals are kept local on computer system 102 (i.e., the captured audio signals, or information related to the audio signals, are not transmitted to any external systems or devices).

At block 206, EAPVT component 110 can check whether a predefined condition has been met based on the voice/speech/sound recognition performed at block 202. One example of such a predefined condition is the recognition of an unknown voice. In this example, the home security system 102 can maintain information regarding a group of "known and approved" users within the home, and any voice that does not correspond to one of the known and approved users can be classified as an unknown voice/user. The known and approved users can be enrolled into the system via, e.g., a predetermined training process whereby each user speaks a number of training phrases so that system 102 can build and save a voice model for the user. The known and approved users can also be enrolled into the system via other techniques, such as by capturing the voice (and photo/video) of an unknown user and relaying the captured voice/photo/video information to a system administrator for approval to add that user to the list of known and approved users.

Another example of a predefined condition that may be met at block 206 is the recognition of the phrase "Help!" or "Fire!" Yet another example of such a predefined condition is the recognition of an environmental sound such as glass breaking, an explosion, an alarm, a dog barking, a person screaming, a baby crying, and so on. These various predefined conditions can be configured/enabled by the homeowner via a setup user interface provided by computer system 102.

If a predefined condition has not been met at block 206, EAPVT component 110 can return to block 202 and can continue listening for/processing audio signals received via audio capture devices 108.

However, if a predefined condition is met at block 206, EAPVT component 110 can conclude that a situation has possibly occurred that requires video surveillance (e.g., a security breach or emergency). Accordingly, EAPVT component 110 can trigger (e.g., send a signal to) the video capture devices 106 located in the area where the audio signal was captured to begin video recording (block 208). In certain embodiments, EAPVT component 110 can also cause home security system 102 to send an alert to the homeowner, or a third party such as a security service provider, indicating that video surveillance has been triggered (block 210). This can be useful if the homeowner or third party wishes to view the captured video footage in real-time (via, e.g., a smartphone app, live video monitor, etc.) so that they can observe the situation in the home and take appropriate steps as needed. For instance, if the video surveillance was triggered by an unknown voice, the homeowner or third party can view the video footage and determine whether there are intruders in the home. Alternatively, if the video surveillance was triggered by an explosion sound, the homeowner or third party can view the video footage and determine whether an event has occurred that requires the dispatch of emergency (e.g., fire, medical) personnel to the home.

The alert described above can also be useful if the homeowner or third party simply wishes to be made aware that a potential security/emergency situation is in progress at his/her home. This alert can take various forms, such as an email, a text, an automated phone call, a tweet, or the like. In response to the alert, the homeowner can perform any of a number of actions, like making a call (to, e.g., police, fire, a neighbor, etc.), turning on an alarm, controlling the video cameras (e.g., zoom, rotate, pan, etc.), and so on. In some embodiments, these actions can be facilitated by an appropriate user interface (e.g., button-based, voice-based) that is made available to the user at the time the alert is received.

At block 212, after the expiration of a preconfigured period of time (e.g., 10 minutes, 30 minutes, 1 hour, etc.) or after the occurrence of a predefined termination event, EAPVT component 110 can automatically disengage the video cameras, thereby stopping the video surveillance. One example of such a predefined termination event is an explicit command from the homeowner/third party to disengage the cameras. Another example of such a predefined termination event is the detection of a particular object in the video or a particular voice, speech phrase, or sound indicating that video surveillance is no longer needed.

Upon disengaging the video cameras, home security system 102 can save the captured video footage in a data store for later review or archiving (block 214). This data store can be a storage device that is local to home security system 102, or a cloud-based storage server.

Finally, workflow 200 can return to block 202, thereby enabling home security system 102 to restart video surveillance if another voice, speech, and/or environmental sound-based trigger condition is detected.

With the workflow shown in FIG. 2, the privacy concerns related to always-on video surveillance are advantageously reduced, since video surveillance is only carried out in scenarios where it is specifically authorized by the homeowner. At the same time, by triggering the video surveillance based on certain voices, speech, and/or sounds that indicate likely security or emergency situations, the effectiveness of the video surveillance that is performed is significantly increased.

While the continuous audio monitoring/recognition processing performed by EAPVT component 110 at block 202 carries some privacy risks, the fact that the audio processing is performed entirely locally mitigates these risks. Further, in certain embodiments, EAPVT component 110 can refrain from saving any of the captured audio on a permanent basis. This further reduces the likelihood that the audio will be improperly accessed or abused.

It should be noted that, in some cases, EAPVT component 110 may incorrectly trigger video surveillance because it detects a predefined condition when in fact no such condition has actually occurred within the home (i.e., a false accept). For example, EAPVT component 110 may detect an unknown voice or an alarm sound from a TV program or music that is being played in the home. To address this, EAPVT component 110 can incorporate specific logic to reduce the likelihood of false accepts. For instance, in one embodiment, EAPVT component 110 can, as part of its recognition processing, attempt to detect aspects of the captured audio that characterize it as being pre-recorded. If such aspects are detected (indicating that the audio being analyzed is pre-recorded), EAPVT component 110 can avoid triggering video surveillance, even if one or more predefined conditions are detected. In another embodiment, home security system 102 can be configured with an option to let the homeowner screen the audio in question before beginning video surveillance. One of ordinary skill in the art will recognize other variations, modifications, and alternatives for reducing the false accept rate.

3. Exemplary Computer System

Figure 3:
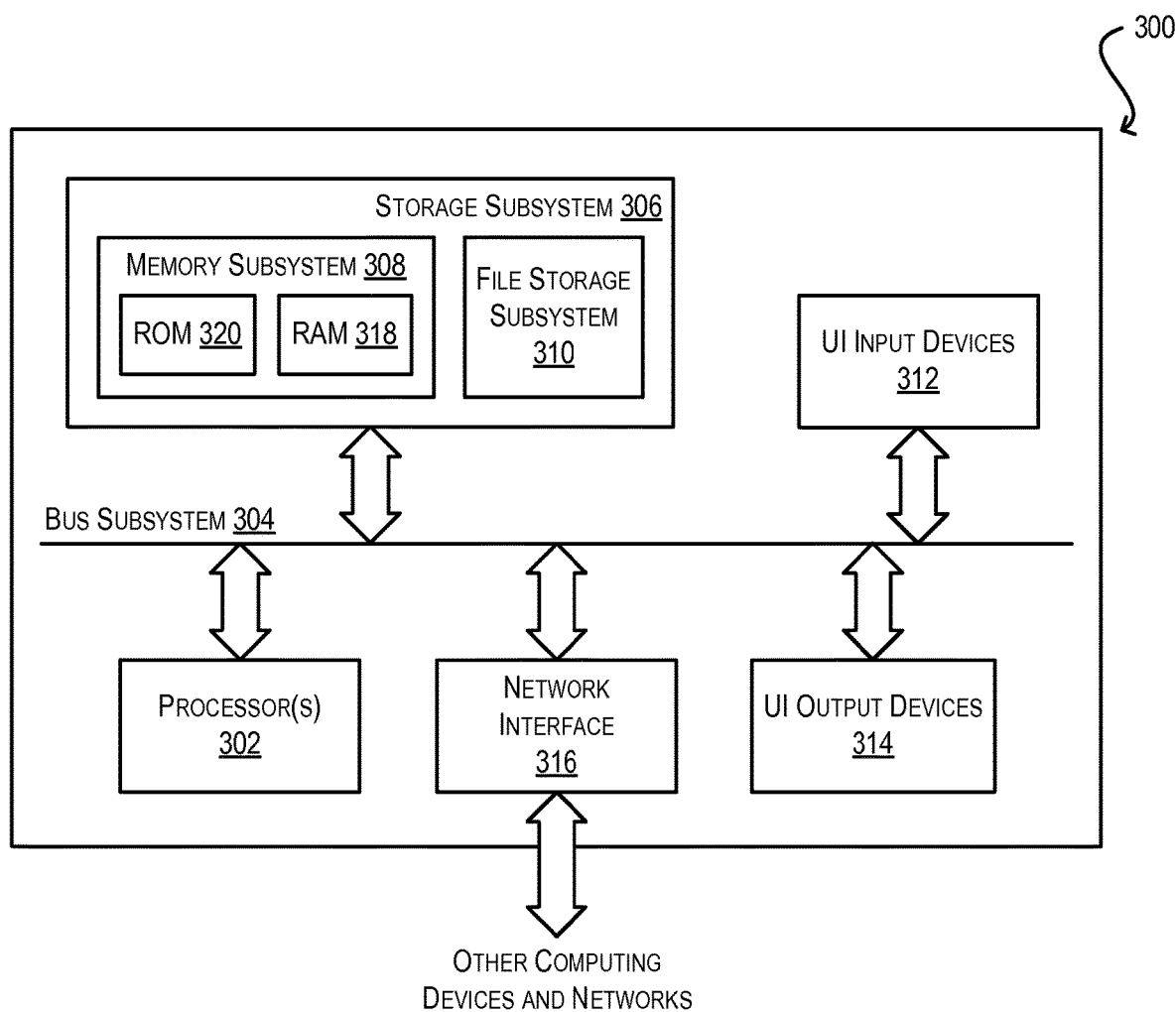
FIG. 3 depicts an exemplary computer system according to an embodiment.

FIG. 3 is a simplified block diagram of a computing system/device 300 that may be used to implement home security system 102 of FIG. 1. As shown, computing system/device 300 can include one or more processors 302 that communicate with a number of peripheral devices via a bus subsystem 304. These peripheral devices can include a storage subsystem 306 (comprising a memory subsystem 308 and a file storage subsystem 310), user interface input devices 312, user interface output devices 314, and a network interface subsystem 316.

Bus subsystem 304 can provide a mechanism for letting the various components and subsystems of computing system/device 300 communicate with each other as intended. Although bus subsystem 304 is shown schematically as a single bus, alternative embodiments of the bus subsystem can utilize multiple busses.

Network interface subsystem 316 can serve as an interface for communicating data between computing system/device 300 and other computing devices or networks. Embodiments of network interface subsystem 316 can include wired (e.g., coaxial, twisted pair, or fiber optic Ethernet) and/or wireless (e.g., Wi-Fi, cellular, Bluetooth, etc.) interfaces.

User interface input devices 312 can include a touchscreen incorporated into a display, a keyboard, a pointing device (e.g., mouse, touchpad, etc.), an audio input device (e.g., a microphone), and/or other types of input devices. In general, use of the term "input device" is intended to include all possible types of devices and mechanisms for inputting information into computing system/device 300.

User interface output devices 314 can include a display subsystem (e.g., a flat-panel display), an audio output device (e.g., a speaker), and/or the like. In general, use of the term "output device" is intended to include all possible types of devices and mechanisms for outputting information from computing system/device 300.

Storage subsystem 306 can include a memory subsystem 308 and a file/disk storage subsystem 310. Subsystems 308 and 310 represent non-transitory computer-readable storage media that can store program code and/or data that provide the functionality of various embodiments described herein.

Memory subsystem 308 can include a number of memories including a main random access memory (RAM) 318 for storage of instructions and data during program execution and a read-only memory (ROM) 320 in which fixed instructions are stored. File storage subsystem 310 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing system/device 300 is illustrative and not intended to limit embodiments of the present invention. Many other configurations having more or fewer components than computing system/device 300 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted.

Further, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a computer system, an audio signal captured from an area to be monitored via video surveillance;
   recognizing, by the computer system via an embedded recognition component, a voice, speech phrase, or environmental sound in the audio signal;
   determining, by the computer system, that the recognized voice, speech phrase, or environmental sound corresponds to a predefined trigger condition;
   in response to the determining, detecting, by the computer system, whether the audio signal includes one or more aspects that characterize the audio signal as being from a pre-recorded television program or pre-recorded piece of music; and
   if the one or more aspects are not detected in the audio signal:
      transmitting, by the computer system, a signal to one or more video capture devices to begin video recording of the area; and
      transmitting, by the computer system, an alert to a mobile device of an individual indicating that video surveillance of the area has been initiated.

2. The method of claim 1 wherein the recognizing of the voice, speech phrase, or environmental sound is performed entirely locally by the embedded recognition component, without interacting with any remote computing resources.

3. The method of claim 1 wherein the predefined condition indicates that a security breach or an emergency situation has occurred in the area to be monitored.

4. The method of claim 1 wherein the predefined condition is configured by a user of the computer system.

5. The method of claim 4 wherein the area to be monitored is within a home, and wherein the predefined condition is configured by a homeowner or occupant of the home.

6. The method of claim 1 further comprising presenting a user interface on the mobile device of the individual that includes controls for controlling operation of the one or more video capture devices.

7. A non-transitory computer readable medium having stored thereon program code executable by a processor, the program code comprising:
   code that causes the processor to receive an audio signal captured from an area to be monitored via video surveillance;
   code that causes the processor to recognize, via an embedded recognition component, a voice, speech phrase, or environmental sound in the audio signal;
   code that causes the processor to determine that the recognized voice, speech phrase, or environmental sound corresponds to a predefined trigger condition;
   in response to the determining, code that causes the processor to detect whether the audio signal includes one or more aspects that characterize the audio signal as being from a pre-recorded television program or pre-recorded piece of music; and
   if the one or more aspects are not detected in the audio signal:
      code that causes the processor to transmit a signal to one or more video capture devices to begin video recording of the area; and
      code that causes the processor to transmit an alert to a mobile device of an individual indicating that video surveillance of the area has been initiated.

8. The non-transitory computer readable medium of claim 7 wherein the recognizing of the voice, speech phrase, or environmental sound is performed entirely locally by the embedded recognition component, without interacting with any remote computing resources.

9. The non-transitory computer readable medium of claim 7 wherein the predefined condition indicates that a security breach or an emergency situation has occurred in the area to be monitored.

10. The non-transitory computer readable medium of claim 7 wherein the predefined condition is configured by a user of the computer system.

11. The non-transitory computer readable medium of claim 10 wherein the area to be monitored is within a home, and wherein the predefined condition is configured by a homeowner or occupant of the home.

12. The non-transitory computer readable medium of claim 7 wherein a user interface is presented on the mobile device of the individual that includes controls for controlling operation of the one or more video capture devices.

13. A computer system comprising:
a processor; and
a non-transitory computer readable medium having stored thereon executable program code which, when executed by the processor, causes the processor to:
receive an audio signal captured from an area to be monitored via video surveillance;
recognize, via an embedded recognition component, a voice, speech phrase, or environmental sound in the audio signal;
determine that the recognized voice, speech phrase, or environmental sound corresponds to a predefined trigger condition;
in response to the determining, detect whether the audio signal includes one or more aspects that characterize the audio signal as being from a pre-recorded television program or pre-recorded piece of music; and
if the one or more aspects are not detected in the audio signal:
transmit a signal to one or more video capture devices to begin video recording of the area; and
transmit an alert to a mobile device of an individual indicating that video surveillance of the area has been initiated.

14. The computer system of claim 13 wherein the recognizing of the voice, speech phrase, or environmental sound is performed entirely locally by the embedded recognition component, without interacting with any remote computing resources.

15. The computer system of claim 13 wherein the predefined condition indicates that a security breach or an emergency situation has occurred in the area to be monitored.

16. The computer system of claim 13 wherein the predefined condition is configured by a user of the computer system.

17. The computer system of claim 16 wherein the area to be monitored is within a home, and wherein the predefined condition is configured by a homeowner or occupant of the home.

18. The computer system of claim 13 wherein a user interface is presented on the mobile device of the individual that includes controls for controlling operation of the one or more video capture devices.

19. The method of claim 1 wherein if the one or more aspects are detected, the computer system avoids transmitting the signal to the one or more video capture devices to begin the video recording.

20. The method of claim 1 further comprising:
upon determining that the recognized voice, speech phrase, or environmental sound corresponds to the predefined trigger condition, providing the audio signal to the individual for screening, prior to transmitting the signal to the one or more video capture devices to begin the video recording.

21. The method of claim 1 further comprising, subsequently to transmitting the alert:
identifying an occurrence of a predefined termination event; and
in response to identifying the occurrence of the predefined termination event, transmitting a signal to the one or more video capture devices to stop the video recording.

22. The method of claim 21 wherein the predefined termination event is detection of a particular object in video recorded by the one or more video capture devices.

23. The method of claim 21 wherein the predefined termination event is detection of a particular voice, speech phrase, or voice indicating that video surveillance of the area is no longer needed.

24. The method of claim 1 wherein determining that the recognized voice, speech phrase, or environmental sound corresponds to the predefined trigger condition comprises:
determining that the recognized voice is an unknown voice that does not correspond to any of a group of known users enrolled into the computer system.

* * * * *